(12) United States Patent
Engle

(10) Patent No.: US 6,467,507 B1
(45) Date of Patent: Oct. 22, 2002

(54) CLIP FOR ATTACHING A COMPONENT TO A PLASTIC MATERIAL MOUNTING SURFACE

(75) Inventor: Brian A. Engle, Armada, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/102,368

(22) Filed: Mar. 20, 2002

(51) Int. Cl.⁷ .................................................. F16L 11/00
(52) U.S. Cl. ...................... 138/112; 138/110; 138/156; 138/151; 248/205.3; 248/74.3
(58) Field of Search .................. 138/112, 110, 138/156, 121; 248/205.3, 74.3

(56) References Cited

U.S. PATENT DOCUMENTS

| | | | |
|---|---|---|---|
| 1,435,311 A | 11/1922 | Knight | 138/110 |
| 3,169,005 A | 2/1965 | Wallach | 248/74.3 |
| 3,454,249 A | 7/1969 | Geisinger | 248/205.3 |
| 3,473,768 A | 10/1969 | Piasecki | 248/68.1 |
| 3,684,223 A | 8/1972 | Logsdon | 248/74.3 |
| 4,218,814 A | 8/1980 | Hodapp | 138/121 X |
| 4,401,156 A * | 8/1983 | Wojtecki et al. | 138/115 |
| 4,505,006 A * | 3/1985 | Andre | 138/106 |
| 4,934,635 A * | 6/1990 | Sherman | 24/279 |
| 4,997,148 A * | 3/1991 | Sherman | 24/279 |
| 5,102,399 A * | 4/1992 | Chu | 138/106 |
| 5,277,227 A | 1/1994 | Bradshaw et al. | 138/110 |
| 5,806,813 A * | 9/1998 | Binelli | 24/20 TT |
| 5,832,960 A | 11/1998 | Amatsutsu et al. | 138/110 |
| 6,240,967 B1 | 6/2001 | Levert et al. | 138/110 |

* cited by examiner

Primary Examiner—Patrick Brinson
(74) Attorney, Agent, or Firm—MacMillan, Sobanski & Todd, LLC

(57) ABSTRACT

A clip for attaching a component to a mounting surface of a container has a generally tubular body with outwardly extending projections and a component retaining aperture. The clip and the container are formed from similar plastic materials with the container material having the same or lower melt index value. The component is assembled with the clip by insertion through a gap in the clip wall widened under a deflecting force. The clip is placed in contact with the mounting surface while the container has latent heat to melt at least one of the contacting projections and form a bond area attaching the component/clip assembly to the mounting surface of the container.

18 Claims, 2 Drawing Sheets

CLIP FOR ATTACHING A COMPONENT TO A PLASTIC MATERIAL MOUNTING SURFACE

BACKGROUND OF THE INVENTION

The present invention relates generally to fasteners for plastic containers and, in particular, to a clip for attaching a component to a mounting surface of a plastic material container.

Plastic containers, such as automobile fuel tanks, are well known. Fuel tanks are part of the fuel system for the automobile and used for storing the liquid fuel, such as gasoline or diesel fuel, for the automobile's internal combustion engine. Fuel tanks typically include components disposed therein including fuel delivery modules, fuel pumps, fuel filters, and various other components of the fuel system.

Most prior art plastic fuel tanks are constructed of plastic materials such as high density polyethylene (HDPE) and low density polyethylene (LDPE), among others, utilizing a blow-molding process. In the blow-molding process, the plastic material is extruded into a mold and then pressurized against the sides of the mold, forming the tank as a single, unitary body. These prior art plastic fuel tanks typically include a plurality of components such as wiring harnesses, vapor lines, and the like, attached to the exterior surface thereof. Traditionally, these components are attached to the blow-molded fuel tanks with clips using a costly and time-consuming process known in the art as a "hot plate welding" process. The hot plate welding process involves heating a surface of the clip, heating a portion of the exterior surface of the tank, and then placing the respective heated areas of the clip and tank in contact with one another to form a bond. After the clips are hot plate welded to the exterior surface of the tank, the components are then placed in the clips. Other alternatives to the hot plate welding process include the use of a spin welding process, an ultrasonic welding processes, or by creating a die lock in the molded tank. Creating a die lock, however, is generally difficult and occasionally impossible due to geometry constraints. In addition, the clips of the prior art are orientation specific in that the clips have a specific mounting surface that must be oriented towards the exterior surface of the container to which it is to be attached in order to be attached correctly. Any deviation in the mounting orientation of the clips can result in an inadequate bond.

Moreover, regulatory changes affecting evaporative emissions have driven fuel tank designs to internalize the components that traditionally have been welded to the outside surface of plastic fuel tanks, such as valves and vapor lines because these each of these external component connections are a potential evaporative emissions source. Hot weld points that penetrate the tank permeation barrier, in particular, are noted sources of evaporative loss. Attaching components to the interior surface of blow-molded tanks is difficult without first creating a large opening in the tank and then placing the components in the interior of the tank. The large opening is an additional evaporative emissions source, which defeats the purpose of minimizing evaporative emissions from the tank. Components are also placed inside tanks on rods, which results in a hole in the side of the tank that must be sealed. More recently, fuel tanks have been manufactured with a process known as thermoforming, which provides for additional configurations for fuel tanks because the tank is formed in two halves having opposing planar attachment faces that are then joined together. Because the tank is formed in halves, this presents an opportunity to locate components inside the fuel tank that previously have been located on the exterior of the tank.

It is desirable to attach components to a surface of a plastic container without the use of hot plate welding in order to reduce the overall cost of the containers. It is also desirable to attach components to the interior surface of plastic containers without regard to the orientation of the clips. It is desirable to reduce the amount of evaporative emissions emanating from fuel tanks.

SUMMARY OF THE INVENTION

The present invention concerns a clip for attaching a component to a mounting surface constructed of a plastic material. The clip includes a preferably tubular clip body of any suitable shape having a central aperture defined by an interior surface and an exterior surface. A plurality of projections are formed on and extend radially outwardly from the exterior surface. The projections can be in the shape of barbs, ridges, teeth, dimples, small hemispheres, or the like. A gap extends through a wall of the clip body between the interior and exterior surfaces and has a width insufficient to pass the component. In one embodiment, the gap extends between opposite ends of the clip body generally parallel to a longitudinal axis. Alternatively, the gap is helical in shape extending around the clip body between the opposite ends. Regardless of its shape, the clip body wall can be deflected outwardly to widen the gap for receiving the component in the central aperture. When the deflecting force is removed, the clip returns to the original shape and the component is securely retained.

The clip body is preferably constructed of high density polyethylene (HDPE), low density polyethylene (LDPE), or the like. The clip body is adapted to receive a component, such as a fuel vapor line or wiring harness, in the central aperture and to adhere to a mounting surface, such as the interior or the exterior surface of a thermoformed fuel tank, without the aid of unique assembly fixtures or pre-heating of the clip.

The clip body adheres to the mounting surface because when placed against the mounting surface, such as during the thermoforming process of a plastic fuel tank, the contacting projections are melted by the latent heat of the recently formed mounting surface. The mounting surface is preferably constructed of HDPE or LDPE material having a melt index slightly lower than the melt index of HDPE or LDPE material of the clip body. If the melt index is lower, the polymer is more viscous. More importantly, the mounting surface has a much greater thermal mass in comparison to the clip body. Because of the large difference in the respective thermal masses of the mounting surface and the clip body and because of the difference in the melt indexes of the mounting surface and the clip body, the latent thermal mass of the plastic material of the mounting surface transfers enough heat into the clip fins to melt the clip fins to create a bond between the mounting surface and the clip body. Thus, the clip welds immediately to the mounting surface when the projections contact the mounting surface. The wall thickness of the clip body acts advantageously as an insulating barrier, stopping the weld process when the projections have melted to the weld area.

The present invention is adaptable to be installed on the component during the component manufacturing process, minimizing the burden when the component is later assembled with the mounting surface. The clip is advantageously not orientation-specific in that the clip may be welded in 360-degree orientation around the longitudinal axis of the clip body with no change in function, minimizing the need for any additional processing of the clip once it is placed on the component.

The clip is preferably manufactured by an injection molding process. Alternatively, this clip may be formed in a simple multi-cavity open-close mold having minimal dimensional requirements. The clip also may be manufactured using a continuous extrusion process, where the axial shape of the clip is extruded, then cut to length and slit along a helical angle, the helical slit being such as to increase the likelihood of a weld bond across the clip opening.

The present invention recognizes that thermoforming and processes that support internalization of components allow the opportunity to create a new type of clip that advantageously does not require specialized tools or processes for installation. The clip according to the present invention is simply pressed against a mounting surface having a latent heat and it automatically welds to the mounting surface. The present invention recognizes that by utilizing the latent heat at a mounting surface of a thermoformed plastic material, a clip formed of a similar plastic material can be welded to the mounting surface by utilizing different thermal masses.

The clip of the present invention may be used advantageously with HDPE and LDPE fuel tanks. In addition, those skilled in the art will appreciate that this type of clip may be used for attaching many types and shapes of components to various mounting surfaces constructed of plastic or similar materials.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
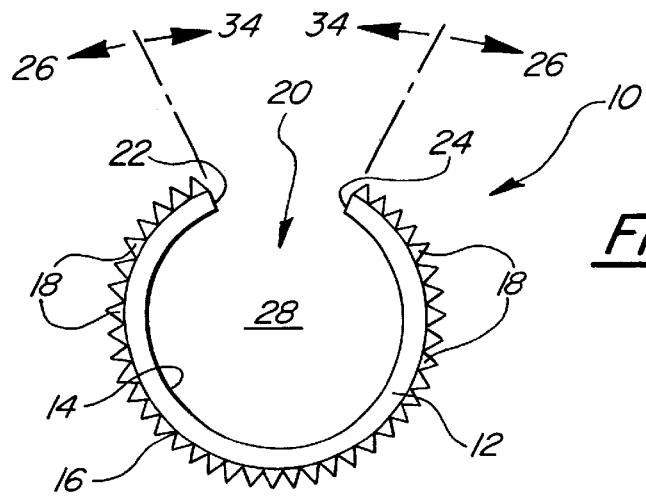
FIG. 1 is a plan view of a clip in accordance with the present invention.

Referring now to FIG. 1, a clip for attaching a component to a plastic material mounting surface is indicated generally at 10. The clip 10 includes a generally tubular clip body 12 having a wall with an interior surface 14 and an exterior surface 16. The clip body 12 is preferably constructed of a plastic material such as high density polyethylene (HDPE), low density polyethylene (LDPE), or a similar material having a first predetermined melt index value. Although shown as being circular in cross section, the tubular clip body 12 can be of any suitable cross-sectional shape adaptable to receive a component and be attached to a mounting surface, outlined in more detail below.

A plurality of generally tooth-shaped projections 18 extend radially outwardly from the exterior surface 16. The projections 18 preferably extend axially along the entire length of the exterior surface 16, and are spaced about the entire circumference of the exterior surface 16. A gap 20 extends through the wall of the clip body 12 and is bounded by a pair of edges 22 and 24 of the wall. The gap 20 allows the clip body 12 to resiliently deform in an opening direction indicated by arrows 26 when the clip 10 is being attached to a component, outlined in more detail below. The interior surface 14 defines a generally circular central aperture 28 therein for receiving a component, discussed in more detail below.

Figure 2:
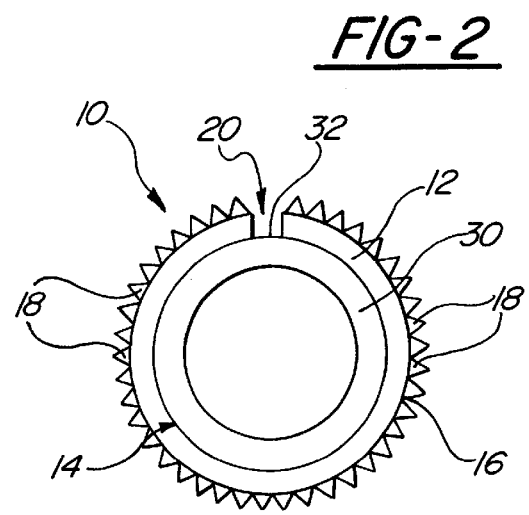
FIG. 2 is a plan view of the clip in FIG. 1 shown with a component disposed therein.

Referring now to FIG. 2, the clip 10 is shown with a component 30 disposed in the aperture 28. An exterior surface 32 of the component 30 is in close contact with the interior surface 14 of the clip body 12. The component 30 is preferably a wiring harness, a vapor line, a conduit, or a similar device having a cross-sectional shape that corresponds to the aperture 28.

During assembly of the clip 10 to the component 30, force is exerted at the edges 22 and 24 to force them in the opening direction indicated by the arrows 26, deforming the clip body 12 as seen in FIG. 1. After the component 30 is disposed within the aperture 28, the force is released and the clip body 12 returns to its original profile, best seen in FIG. 2, the edges 22 and 24 moving in a closing direction indicated by arrows 34, best seen in FIG. 1.

Figure 3A:
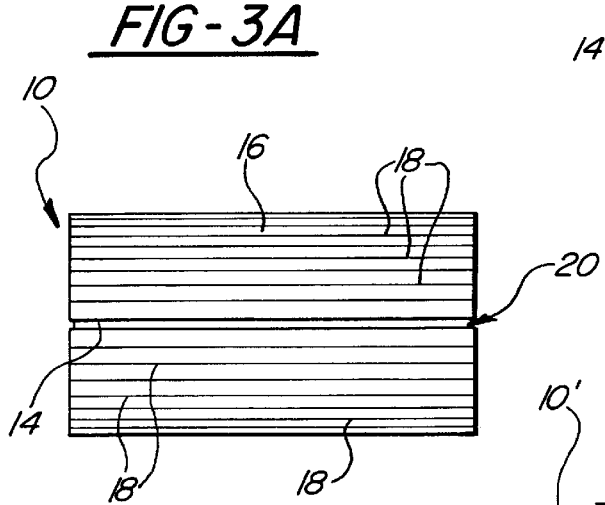
FIG. 3a is an elevation view of the clip shown in FIG. 1.

Referring now to FIG. 3a, the clip 10 is shown in side elevation view to demonstrate that the projections 18 on the exterior surface 16 of the clip body 12 extend along the entire axial length of the exterior surface 16. The gap 20 extends in a straight line along the longitudinal axis of the exterior surface 16.

Figure 3B:
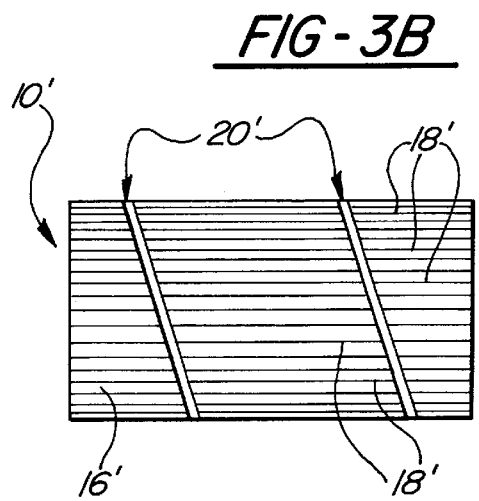
FIG. 3b is an elevation view of an alternative embodiment of the clip according to the present invention.

Referring now to FIG. 3b, an alternative embodiment of the clip according to the present invention is indicated at 10'. In this alternative embodiment, a gap 20' extends in a helical shape along the exterior surface 16'. The helical gap 20' advantageously allows the clip 10' to retain a component, such as the component 30 of FIG. 2, increasing the likelihood of a weld bond across the gap 20' and reducing the possibility of the component 30 falling out of the gap 20' when the clip assembly is mounted to a mounting surface, discussed in more detail below.

Figure 4:
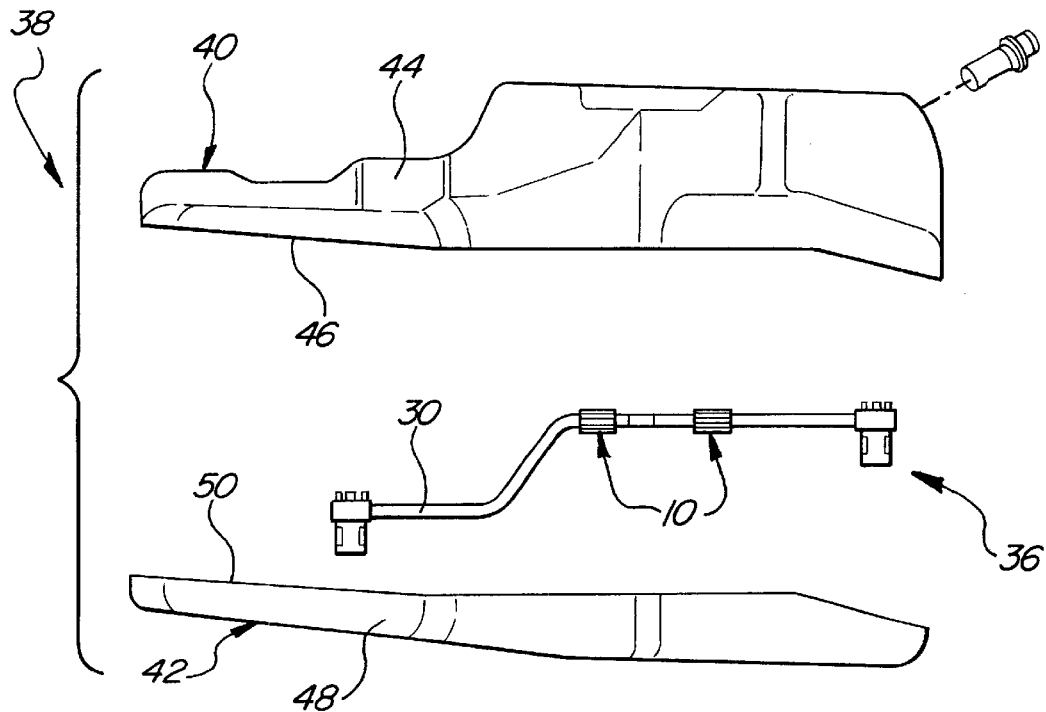
FIG. 4 is an exploded elevation view of an assembly including a plastic container and the clip of FIG. 1 attached to a component.

Referring now to FIG. 4, two clips 10 are shown disposed on the elongated component 30, such as a vapor line for an automotive fuel system, forming a component/clip assembly 36. However, depending upon the size and shape of the component 30, the component/clip assembly 36 may have only one clip 10 or more than two of the clips. A plastic container, such as an automotive fuel tank, is indicated generally at 38. The tank 38 is preferably constructed of HDPE, LDPE, or a similar material having a predetermined second melt index that is lower than the first melt index of the HDPE or LDPE material of the clip body 12. The tank 38 includes an upper tank portion 40 and a lower tank portion 42. A wall of the upper portion 40 has an exterior surface 44 with a downwardly facing attachment surface 46 defining a wall edge. A wall of the lower portion 42 has an exterior surface 48 with an upwardly facing attachment surface 50 defining a wall edge.

Figure 5:
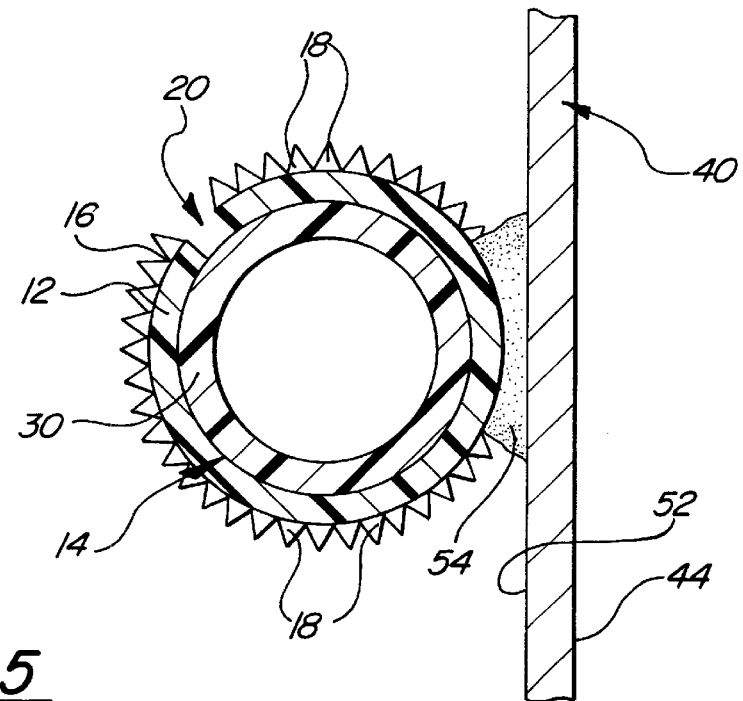
FIG. 5 is a cross-sectional view of the clip and component of FIG. 2 shown welded to a mounting surface.

Each tank portion 40 and 42 is formed separately, preferably by a thermoforming process. After the tank portions 40 and 42 are formed by the thermoforming process but prior to joining the tank portions 40 and 42, the component 30 is placed in the aperture 28 of at least one of the clips 10, forming the component/clip assembly 36. After being formed by the thermoforming process, the tank portions 40 and 42 are formed to the shape of the tank, but remain at a relatively high temperature having a thermal mass greater than the thermal mass of the projections 18 on the clip body 12. Preferably, the material of the tank 38 and the material of the clip body 12 are similar, such as the same grade of HDPE or LDPE, but the material of the tank 38 has a lower melt index than the material of the clip body 12. The component/clip assembly 36 is placed in contact with a high temperature interior surface 52 of the upper tank portion 40 as shown in FIG. 5, or a high temperature interior surface of the lower tank portion 42 (not shown).

The ones of the projections 18 on the exterior surface 16 of the clip body 12 that make contact with the high temperature interior surface 52 of the upper tank portion 40 melt, forming a bond area 54 between the clip body 12 and the interior surface 52. The interior surface 52 is preferably in a solid state, but at a relatively high temperature at or above the melting point of the material of the clip body 12. Alternatively, the high temperature interior surface 52 is in a still molten state after the thermoforming process, advantageously aiding in forming the bond area 54 between the clip body 12 and the interior surface 52.

Alternatively, the clip 12 is placed in contact with one of the exterior surfaces 44 and 48, forming a bond area between the clip body 12 and the exterior surface of the tank 38. The clip 10 is now securely welded to the wall of the tank 38. The thermoforming process leaves the walls of the tank portions 40 and 42 in a solid state, but at a relatively high temperature at or above the melting point of the material of the clip body 12. The projections 18 contacting the tank wall surface melt to form the bond or weld area 54, securely affixing the component/clip assembly 36 to the tank 38. The thickness of the clip wall between the surfaces 14 and 16 acts advantageously as an insulating barrier and creates a dramatic increase in surface contact, reducing the temperature and stopping the weld process, when the projections 18 have melted into the weld area 54.

Because the projections 18 extend from the entire circumference of the exterior surface 16, the orientation of the exterior surface 16 of the clip body 10 with respect to the interior surface 52 is immaterial and any of the projections 18 may be melted to form the weld area 54. However, if the gap 20 happens to face the surface 52, the gap will be welded closed. With the alternate embodiment clip 10', some portion of the helical gap 20' will always face the surface 52 and will be welded closed.

In accordance with the provisions of the patent statutes, the present invention has been described in what is considered to represent its preferred embodiment. However, it should be noted that the invention can be practiced otherwise than as specifically illustrated and described without departing from its spirit or scope. For example, the projections 18 are shown as generally tooth-shaped but those skilled in the art will realize that the projections could be barbs, ridges, teeth, dimples, small hemispheres, or the like.

What is claimed is:

1. A clip for attaching a component to a plastic material mounting surface, comprising:
    a generally tubular clip body having an aperture for receiving a component, said clip body having a wall with an interior surface defining said aperture and an exterior surface, and said clip body having a gap extending through said wall between said interior and exterior surfaces, a width of said gap being insufficient to pass the component;
    a plurality of projections extending outwardly from said exterior surface of said clip body and being formed of a plastic material having a thermal mass less than a thermal mass of a plastic material mounting surface; and
    said wall being resiliently deformable to widen said gap to pass the component into said aperture and whereby when the component is retained in said aperture and said clip body is placed in contact with the mounting surface having a predetermined latent heat, at least one of said projections in contact with the mounting surface melts forming a bond area securing said clip body and the component to the mounting surface.

2. The clip according to claim 1 wherein said gap extends generally parallel to a longitudinal axis of said clip body.

3. The clip according to claim 1 wherein said gap extends helically about said clip body.

4. The clip according to claim 1 wherein said plastic material is HDPE.

5. The clip according to claim 1 wherein said plastic material is LDPE.

6. The clip according to claim 1 wherein said projections extend a length of said clip body.

7. The clip according to claim 1 wherein said projections are generally tooth-shaped.

8. An assembly for attaching a component to a plastic material fuel tank, comprising:
    a component;
    a generally tubular clip body having an aperture retaining said component, said clip body having a wall with an interior surface defining said aperture and an exterior surface; and
    a plurality of projections extending outwardly from said exterior surface of said clip body and being formed of a plastic material having a predetermined first melt index value higher than a second melt index value of a plastic material fuel tank and whereby when said clip body is placed in contact with a mounting surface of the fuel tank having a predetermined latent heat, at least one of said projections in contact with the mounting surface melts forming a bond area securing said clip body and said component to the mounting surface.

9. The clip according to claim 8 wherein said clip body has a gap extending through said wall between said interior and exterior surfaces, a width of said gap being insufficient to pass said component, said wall being resiliently deformable to widen said gap to pass said component into said aperture.

10. The clip according to claim 9 wherein said gap extends generally parallel to a longitudinal axis of said clip body.

11. The clip according to claim 9 wherein said gap extends helically about said clip body.

12. The clip according to claim 8 wherein said plastic material is one of HDPE and LDPE.

13. The clip according to claim 8 wherein said projections extend a length of said clip body.

14. The clip according to claim 8 wherein said projections are generally tooth-shaped.

15. The clip according to claim 8 wherein said component is one of a wiring harness, vapor line and a conduit.

16. A method for attaching a component to a container formed of a plastic material and having at least one mounting surface, comprising the steps of:
    a) providing a component;
    b) providing a generally tubular clip body constructed of a plastic material having a predetermined first melt index value, the clip body having an aperture formed therein and an exterior surface, the clip body having a plurality of projections extending outwardly from the exterior surface;

c) assembling the component into the aperture in the clip body;

d) manufacturing a container by a thermal process resulting in latent heat at a mounting surface on the container, the container constructed of a plastic material having a predetermined second melt index value greater than the first melt index value; and e) positioning the clip body with at least one of the projections in contact with the mounting surface to melt the at least one projection and form a bond area attaching the component and the clip body to the container.

17. The method according to claim 16 wherein said step b) includes forming a gap in a wall of the clip body and said step c) is performed by widening the gap and inserting the component through the gap into the aperture.

18. The method according to claim 16 including forming the clip body and the container from one of HDPE and LDPE.

* * * * *